June 11, 1968   M. J. PREBISH   3,388,373
SEA-LIFE LOCATOR

Original Filed Dec. 17, 1965   3 Sheets-Sheet 1

INVENTOR
Michael J. Prebish

BY William Grobman

ATTORNEY

June 11, 1968   M. J. PREBISH   3,388,373
SEA-LIFE LOCATOR

Original Filed Dec. 17, 1965   3 Sheets-Sheet 2

INVENTOR
Michael J. Prebish

BY William Grobman
ATTORNEY

June 11, 1968 M. J. PREBISH 3,388,373
SEA-LIFE LOCATOR

Original Filed Dec. 17, 1965 3 Sheets-Sheet 3

INVENTOR
Michael J. Prebish

BY William Grobman
ATTORNEY

United States Patent Office 3,388,373
Patented June 11, 1968

3,388,373
SEA-LIFE LOCATOR
Michael J. Prebish, Adelphi, Md., assignor to General Precision, Inc., Binghamton, N.Y., a corporation of Delaware
Continuation of application Ser. No. 514,525, Dec. 17, 1965. This application July 24, 1967, Ser. No. 655,673
8 Claims. (Cl. 340—6)

ABSTRACT OF THE DISCLOSURE

The location of underwater sounds has been a problem whose solution is sought by many individuals and groups. The present system uses a plurality of spaced underwater sound receivers coupled with means for transmitting the received sound to a single reception point. In the past, this information was used to manually plot the location of the sound. In the present system, the differences in the times of reception of the same sound by the separate receivers are converted into electrical voltages which are used to determine the size of circles traced by the cathode ray of a CRT about the relative locations on the face of the CRT of the sound receivers. The circles are then simultaneously enlarged by the same amounts until they intersect. The intersection indicates the relative location of the sound source. Potentiometers are used to generate the potentials which determine the size of the circles.

---

This application is a continuation of my parent application, Ser. No. 514,525, filed on Dec. 17, 1965, and now abandoned.

This invention relates to a sea-life locator, and more particularly to a system for readily displaying the location of sources of under-sea sound signals which are remote from the display device.

One of the problems which has plagued modern man in many of his activities has been the ready identification of the position or location of a source of signals. This is true in connection with artillery fire where the source of a sound is located, and it was equally true during the pioneer days in North America when the hunter would try to locate his quarry by means of the sound the quarry made. As the distance over which the information was received increased, the distance at which a positive identification of the location of a signalling object had to be made also increased. This became particularly true when navigational instruments were being devised for modern high speed transportation systems which range far and wide. Radio beacons may be used as markers to indicate to aircraft in its vicinity the location of the beacon. However, this information may be utilized only if the pilot of the aircraft can locate his ship with respect to the beacon. Thus, even through the beacon transmits a unique signal which is characteristic of that beacon only, the beacon location may be known but the aircraft location is not, unless the relative position of the two are known.

In the past, one effective way in which the locations of distant signal sources were determined was by triangulation where a signal from a source was received by a plurality of receivers and the bearing between each of these receivers and the source was noted. The intersection of the charted bearings from each of these receivers then indicated the position of the signal source. However, triangulation is a system which can be used only when a plurality of directional receivers at different locations are available. When a single receiver is used to identify the location of a remote signal source, other means must be provided.

Another system of locating under-water sound sources has been developed for use in water where the identification of the location of sea life such as schools of fish is desired. In this system, several under-water listening devices are arranged to pick up under-water sounds from a sound source and to transmit, by radio, the signals which are picked up to a single position, preferably a multi-channel radio receiver or a plurality of radio receivers. At the receiver position, the sounds picked up by the listening devices are plotted on charts or are otherwise utilized to locate the position of the sound source with respect to each of the listening devices. If the position of the receiver with respect to each of the listening devices is known, then the location of the source of sound, such as a school of fish, with respect to the receiver position is also known. This system is useful in fishing fleets for locating a school of fish readily, and accurately to assure a good catch and to save time. The under-water listening devices, which are located on each of the ships in the fleet may be standard acoustic depth gauges, sonar devices, or the like, in which the output from the sound transducers may also be coupled to the radio equipment normally carried on board the ship. Thus, the acoustic transducers produce outputs in accordance with the sound received through the water by them, and this output is used to modulate the radio equipment on board the ship. This system may also be used as a rapid means for locating ships or airplanes which are in distress, and similar water-borne devices.

In the past, the implementation of a system of this nature usually required a substantial amount of time. The information was received from each of the under-water listening devices and the received information was, in turn, transmitted to a single receiver position. The location of the listening devices with respect to the receiver position was manually plotted on charts. The information received by the listening devices and transmitted to the receiver position was also recorded graphically. Then, templets or other suitable devices were used on a trial-and-error basis to locate the sound source.

It is an object of this invention to provide a new and improved system for locating signal sources.

It is another object of this invention to provide a new and improved apparatus for rapidly and efficiently determining the location of a source of signals with respect to a plurality of signal transducers.

It is a further object of this invention to provide a new and improved system for rapidly and accurately displaying the relative locations of a source of signals and a plurality of transducers which respond thereto.

It is still another object of this invention to provide a new and improved system for rapidly, efficiently, and accurately displaying the relative positions of a receiver and a source of signals.

Other objects and advantages of this invention will become more apparent as the following description proceeds, which description should be considered together with the accompanying drawings in which.

Figure 1:
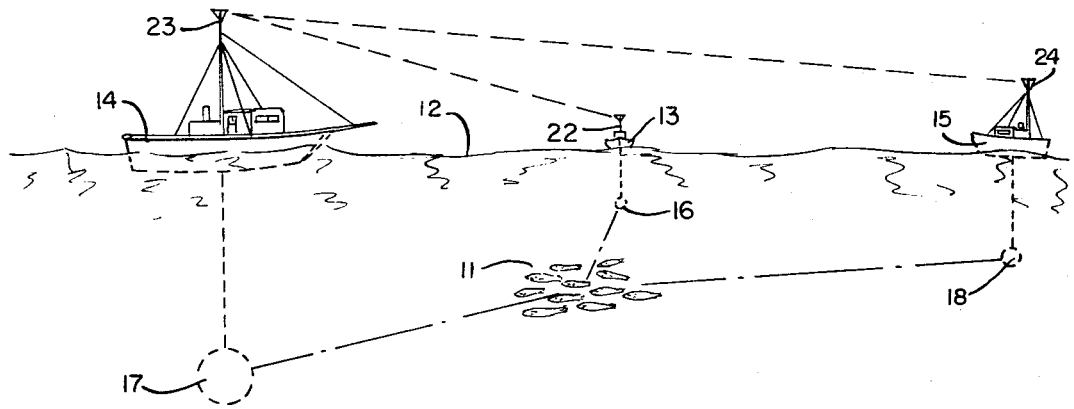
FIG. 1 is a pictorial illustration of the sea-life locator of this invention as it is used by a fleet of fishing vessels to locate a school of fish.

Referring now to the drawings in detail and to FIG. 1 in particular, the reference character 11 designates a school of fish, which, in this discussion, is the source of signals to be located. Three fishing vessels, 13, 14 and 15, are shown at the surface 12 of a body of water such as one of the oceans. Hanging beneath the individual ships 13, 14 and 15 are under-water listening devices 16, 17 and 18 respectively. Antennas 22, 23 and 24 are mounted above each of the ships 13, 14 and 15 respectively to transmit radio signals from ships 14 and 15 to ship 13.

In operation, when sea-life is suspected to be present in the general neighborhood, ships 13, 14 and 15 listen in. The positions of each of the ships 13, 14 and 15 are known to each other, and each ship comprises a sound head or transducer 16, 17 or 18 which responds to the reception of sound signals transmitted through the water 12 from the fish 11, and which generates electrical signals in response to the reception of the sound signals. In addition, both ships, 14 and 15, contain radio transmitters having preselected frequencies of transmission. The outputs of the sound heads 17 and 18 modulate the radio frequency signals generated by the respective transmitters, and the resulting modulated radio signals are transmitted into space by the antennas 23 and 24 to be received by receivers on the ship 13. In the ship 13, the received modulated radio signals from ships 14 and 15 are demodulated, and the resulting modulating signals are recorded on charts or recorders. The receiver contained on board ship 13 is a multi-channel receiver and receives the radio transmissions from both of the ships 14 and 15. Since each of the ships 14 and 15 has its own frequency of transmission, the receiver on board ship 13 must separate each of the signals from the others. Then each is demodulated to produce an output which is recorded.

Figure 2:
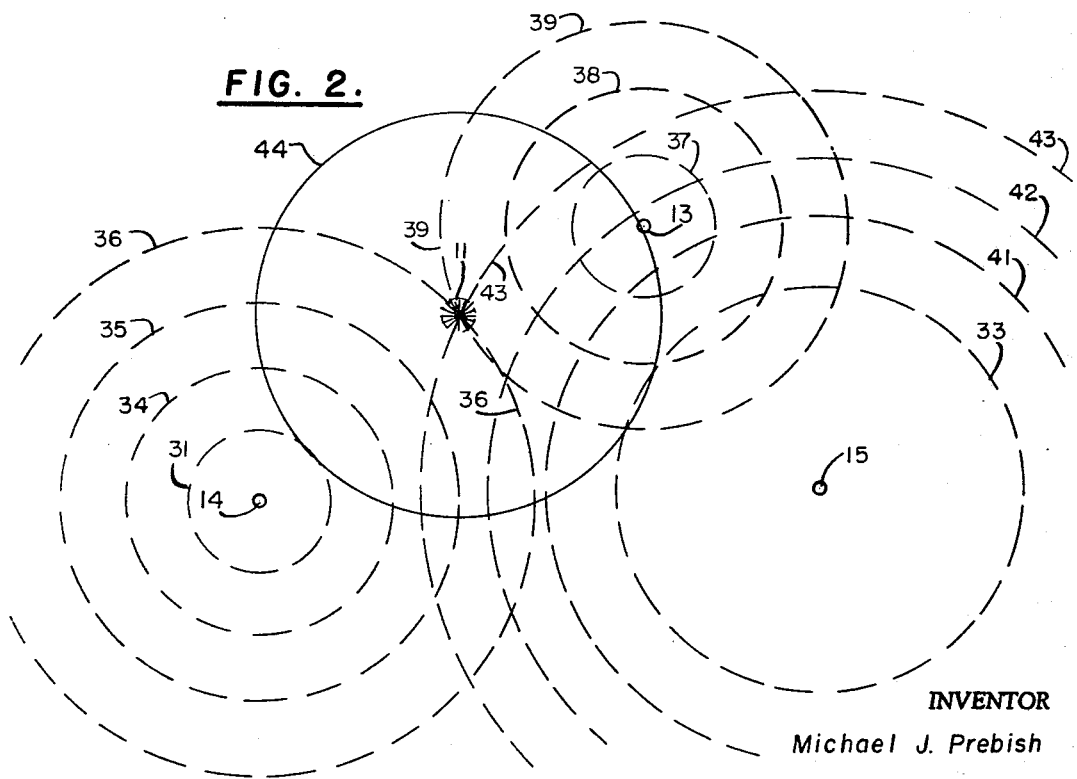
FIG. 2 is a graphical illustration of the method by which the system of this invention operates.

Normally, the sound emitted by the school of fish 11 remains fairly uniform over substantial time intervals so that the recording made from the signals received by the listening devices 16, 17 and 18 appear to be the same. However, periodically, a change will appear in the pattern of the received sound signals. The fish may change speed or course, or another action will occur which will interrupt or change the pattern being recorded. Since the ships 13, 14 and 15 are not all the same distance from the school of fish, the times at which the break in the sound pattern reaches the different ships will vary. Thus, on the recorder charts in the ship 13, the break in the pattern will be recorded at different times. In FIG. 2, the school of fish is identified as the * marked 11, and the ships 13–15 are shown spaced about the fish 11 at different distances. With signals received from the fish 11, at times which are proportional to the distances of the ships 13–15 from the school 11, it is possible to determine the position of the school of fish 11 with respect to the ships 13–15. The differences in the times of receptions of the signals by the ships 14 and 15 from the reception of the same signals by the ship 13 are determined graphically. If, as mentioned above, a recorder is used to chart the signals from the ships 13–15, then the differences in the times of the signal receptions can be determined by simple subtraction from the chart. The three ships are located on a chart as shown in FIG. 2. Then a circle representative of the differences in the times of reception is drawn about each of the ship's locations. For ship 14, the circle is 31; for ship 15, the circle is 33. Since the difference in the time of reception of the signals received by the ship 13 from the time of reception of the signals by the ship 13 is zero, no circle, or a circle of zero diameter is drawn about the ship 13.

The signal source may also be determined by using a transparent over-lay of concentric circles to find a "given" circle which will be tangent to circles 31 and 33 and pass through circle 13 (circle 13 has a zero radius). The center of this "given" circle 44 represents the signal source 11. Another method uses the original three circles 31, 33 and 13 as starting points. Then, the diameters of the circles about all three of the ships 13, 14 and 15 are increased by the same amount, and new circles are drawn until all three of the circles intersect. This intersection is the location of the school of fish 11 with respect to the ships 13–15. The first layer of trial circles in FIG. 2 are designated 34, 37 and 41 and they are the same amount larger in diameter than the next smaller circle about the individual ships. Then, the circles 35, 38 and 42 are drawn. This process is continued until the circles 36, 39 and 42 are drawn. These three circles intersect at the point 11.

The above-described methods for determining the location of the sound source with respect to the three sound transducers work well, but they are time consuming and subject to many sources of error. Each measurement is a potential source of error as is each circle drawn. To avoid these errors and to shorten the time required to determine the location of a sound source, the equipment illustrated in FIG. 3 was devised. This equipment comprises a chart recorder 51 having a sufficient number of markers to accommodate the necessary number of ship signals and having a chart 52 moving at a speed which is in proportion to time and a bridge which carries specialized apparatus to be described below. A selector switch device 55 for selecting which of the charts are to be monitored and including manual selector knobs 56, 57 and 58 is connected to the chart recorder 52 and to a cathode ray oscilloscope 61. A second switching device 62 is coordinated with the switching selector 55 and comprises manual selection knobs 63, 64 and 65 and is connected to the oscilloscope 61 also. The operation of this equipment will be explained in connection with FIG. 6.

Figure 3:
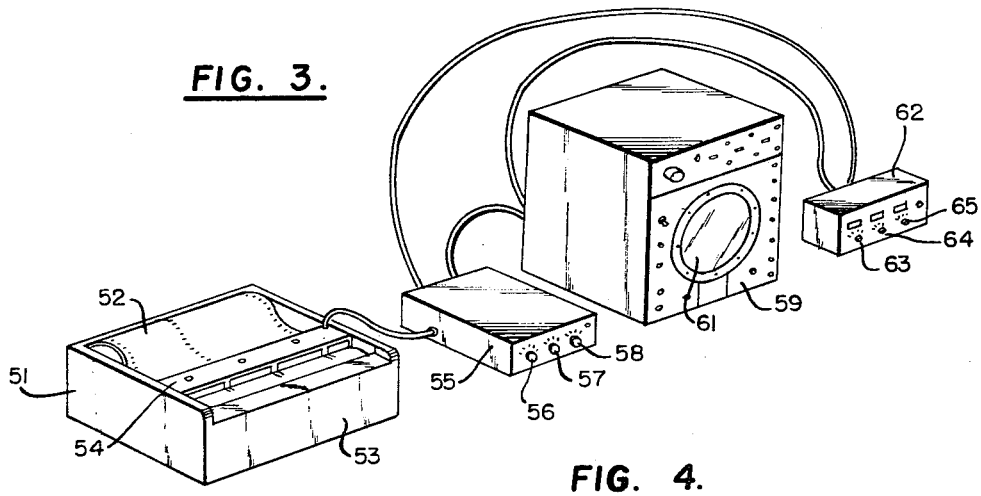
FIG. 3 is a pictorial illustration of the equipment used in this invention.
Figure 4:
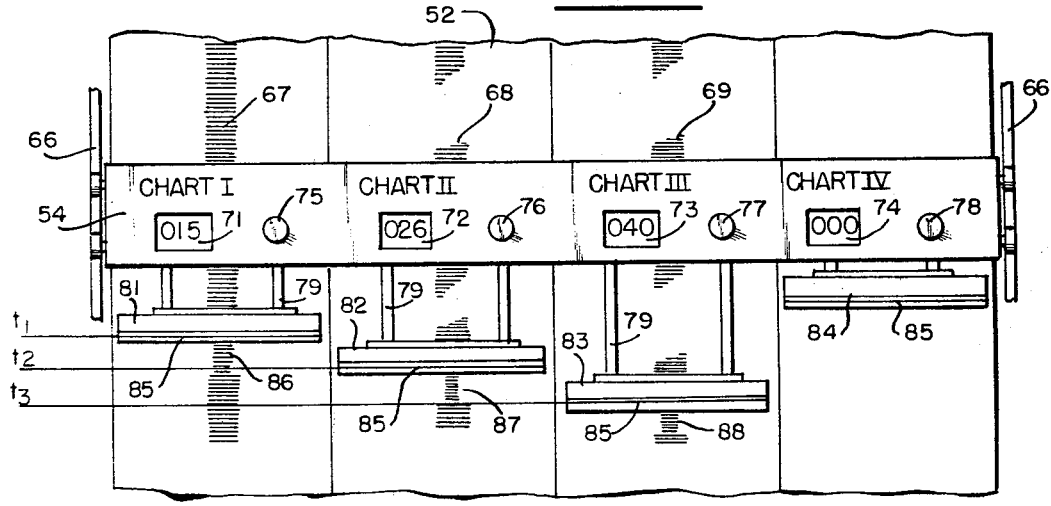
FIG. 4 is a plan view of a portion of the recorder of FIG. 3 showing the bridge of this invention.
Figure 5:
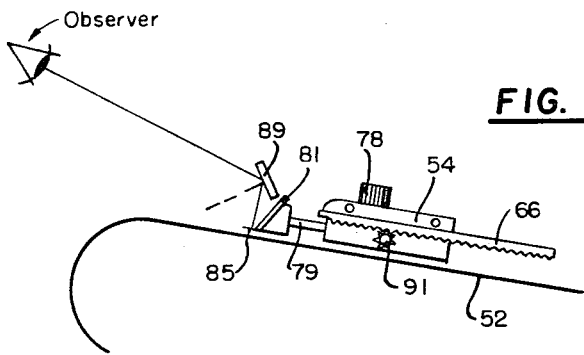
FIG. 5 is a side view of a fragmentary portion of the apparatus of FIG. 4.

The chart recorder 51 may be any standard chart recorder in which the paper, or record receiver, 52 is driven with respect to time. In addition, the recorder 51 must include at least three recording pens or markers. Preferably, the markers are of the type that make an excursion across the paper 52 and contact the paper at the beginning of a record and leave the paper at the end of the record before returning for the next stroke. However, any suitable recorder may be used including galvanometer operated pens, helix and drum recorders, etc. To accomplish the measurement of the time differences between the reception by the individual listening devices of the same signals from a desired sound source, a bridge 54 is added to the standard recorder. The bridge 54 is shown in more detail in FIGS. 4 and 5. Assuming for this discussion that the chart recorder 51 comprises a bed over which a chart 52 is driven with respect to time, and includes a plurality of markers for marking information on the chart 52, a bridge 54 is constructed to pass over the chart 52 and the markers. The bridge 54 should be arranged to extend at right angles to the direction of movement of the record receiver 52 as it is shown in FIG. 3. In FIG. 4, the record receiver 52 is shown with information recorded thereon in the form of three separate recordings 67, 68 and 69, and with the bridge 54 supported on racks 66 mounted on either side of the recorder 51 by means not shown so that the bridge 54 extends across all of the recordings. Since the markers may be any type of conventional markers, they have not been shown in these figures. The bridge 54 comprises, for each record position, a counter 71, 72, 73 and 74; a control knob 75, 76, 77 and 78; and a hair line 85 mounted on movable supports 81, 82, 83 and 84. The designations $t_1$, $t_2$ and $t_3$ represent times that an interruption to the normal recordings occurred. In FIG. 5, the side view of a portion of the recorder 51 shows the rack 66 and the drive pinion 91 for moving the bridge 54. The pinion 91 is driven by its own motor, not shown, or by the same motor that drives the record receiver 52 through a clutch of suitable design. Mounted on the bridge 54 are hair lines 85 which are positioned over each of the recordings 67, 68 and 69 and which are each supported on a pair of rods 79. The rods 79 also carry mirrors 89 attached to the supports 81, 82, 83 and 84 so that an observer may view the hair lines 85 and the recordings 67–69 easily.

In operation, the recorder 51 continues to record information such as the individual recordings 67–69, until a change in the information being recorder occurs. This is shown in FIG. 4 as the changes or breaks 86, 87 and 88 in the recordings 67–69. In the particular example shown, the recording proceeds with the records showing uniform operation of the device being monitored, in this case the school of fish 11. As shown in FIG. 4, the time that the breaks 86–88 occur on the three charts is not the same. Thus, the break 86 is shown at time $t_1$; the break 87 is shown at time $t_2$; and the break 88 is shown at time $t_3$. The reason for this is the varying distances from the source of the signal, the school of fish 11, to the three ships 14, 13 and 15 which serve as the sources of the information from which the records 67–69 are made. As shown, signals received by ship 14 are represented by record 67, those received by ship 13 are represented by record 68, and those received by ship 15 are represented by record 69. Thus, since ship 14 is closest to the source 11, the sound signals from the source reach that ship first. On FIG. 4, the characters $t_1$, $t_2$ and $t_3$ represent the times that the "breaks" 86, 87 and 88 reach the ships. The term "breaks" as used in this discussion refers to any type of common discernable anomaly in the record patterns 67, 68 and 69. These times are represented electrically by means of potentiometers which have their slide contacts connected to the knobs 75, 76, 77 and 78. To operate the bridge 54 to obtain electrical indications of the times the sound signals reach the ships 13, 14 and 15 from the source 11, the drive-means for the bridge 54 is energized so that the bridge moves with the record receiver 52. This locks the bridge 54 to records 67–69. While the bridge and the records are moving together, the knobs 75–77 are manipulated so that the rods 79 extend outwardly from the bridge 54 until the hair line 85 which is carried by the respective supports 81, 82 and 83 is aligned with the same part of the breaks 86, 87 and 88. The amount of movement of the hair lines 85 necessary to align them with the breaks in their respective records is indicated on the counters 71, 72, 73 and 74 for the individual records. In addition, as the knobs 75–77 are manipulated, the slide contacts of the respective potentiometers, not shown in FIG. 4, are moved corresponding amounts. Thus, the amount of relative movement of each of the individual knobs 75–77 is immediately displayed on the counters 71–73 associated therewith, and the settings of potentiometers connected thereto are also related to that movement. Thus, the times of arrival of the sound from the source 11, as received by the ships 13–15, are translated by the bridge 54 and the equipment thereon into electrical quantities. The locking of the bridge 54 to the movement of the record receiver 52 gives the operator of the equipment sufficient time to accurately align the hair lines 85 with the breaks in the records.

Figure 6:
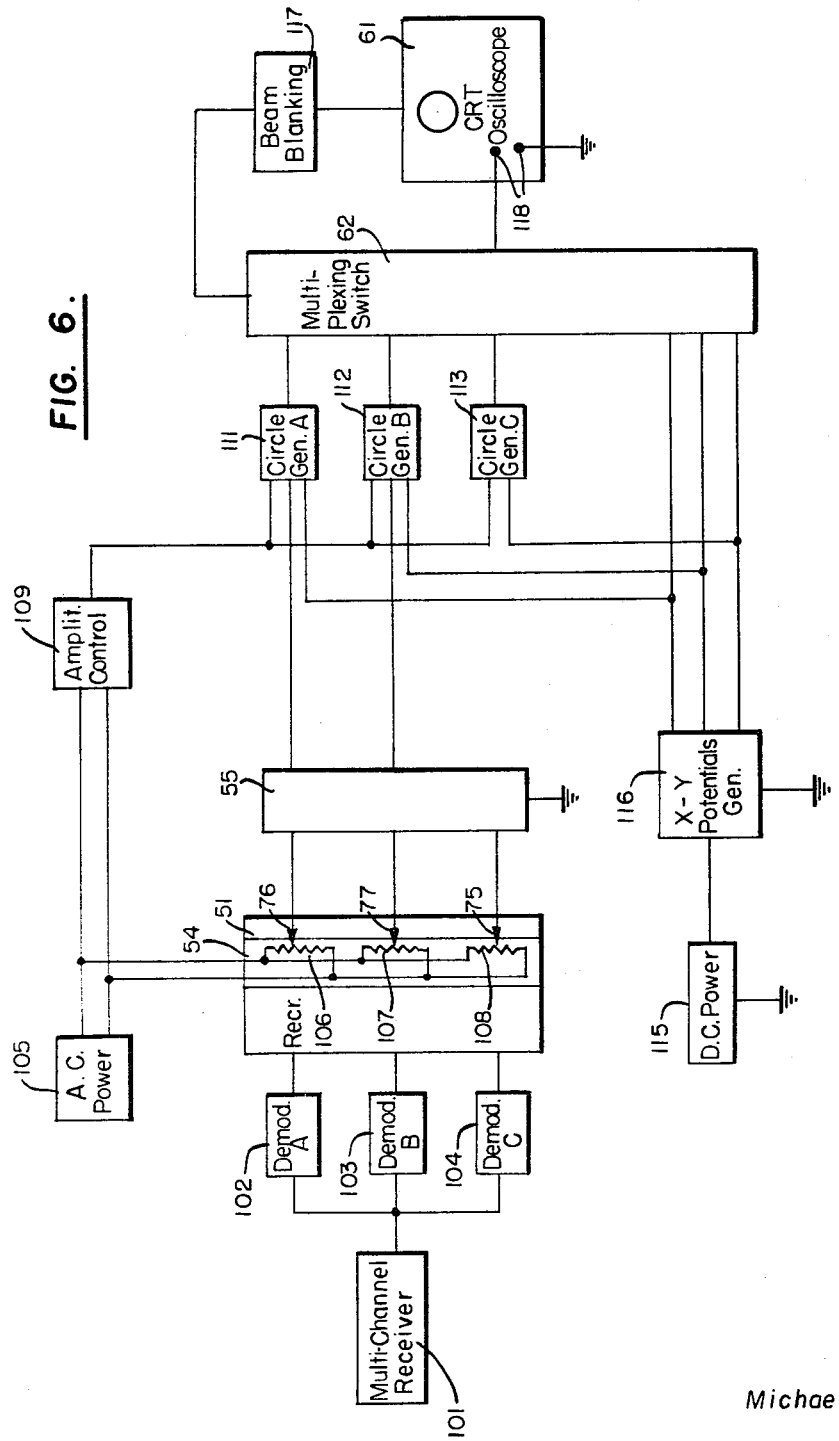
FIG. 6 is a block diagram of the over-all system of this invention.

The over-all equipment used in the method outlined earlier is shown in block form in FIG. 6. To the left is the multichannel receiver 101 which receives the radio transmissions from the ships 13–15. For ease of explanation, three of the demodulators 102–104 have been separated from the receiver itself and are shown separately to represent the demodulation of the information received by the three ships. The outputs from the demodulators 102–104 are fed into the recorder 51 to drive the three markers (not shown) which make the records 67–69. Thus, the signals received by the ships 13–15 are used to make the recordings 67–69. The bridge 54 is shown in FIG. 6 supporting three potentiometers 106, 107 and 108, which are connected in parallel to a source 105 of alternating current. The knobs 75, 76 and 77 are shown as the slides of the individual potentiometers 106–108. The source 105 also feeds an amplitude control 109 and three circle generators 111, 112 and 113. Connected to the outputs from the circle generators 111–113 is a multiplexing switch 114, the single output from which is connected to the sweep input terminals 118 of a cathode ray oscilloscope 61. The three potentiometer slides 75–77 are connected to a summation circuit 55, one output from which is applied to the circle generator 111 and another output of which is connected to the circle generator 112. What would be a third output is grounded internally to supply a datum. A source 115 of direct current is connected to X–Y potentials generator 116 to generate three sets of X–Y potentials, each of which represents the position with respect to the receiver 101 of one of the ships 13–15. The three sets of X–Y potentials generated by the generator 116 are fed to individual circle generators 111–113 and to the multiplexing switch 62. In addition, an output from the multiplexing switch 62 is connected to the beam blanking circuits 117 of the oscilloscope 61.

Since the block diagram of FIG. 6 represents the overall system of this invention, the description of its operation will be the description of the system as a whole. The radio signals transmitted by ships 14 and 15 are received by the multi-channel receiver 101 where they are separated into separate radio transmissions. For illustrative purposes, the individual signals from each of the ships 13–15 are shown by separate demodulators 102, 103 and 104. From each of these demodulators 102–104 the outputs should be replicas of the sound received by the ships 13–15. In practice, if a fourth "mother" ship is used to house the equipment of FIG. 6, then ships 13–15 would be used as listening posts and the receiver 101 would require the three channels. As shown in FIG. 4, the outputs from the individual demodulators 102–104 control the markers in the recorder 51 to produce a record of each of the received signals. When a break 86–88 in the normal records 67–69 is recorded, the bridge 54 drive is started. The drive moves the bridge 54 at the same speed and in the same direction as the record receiver 52 so that the adjustments of the hair lines 85 can be made accurately. The bridge 54 is supported on two gear racks 66, one on each side of the recorder 51. Drive pinion 91 is mounted on at least one side of the recorder 51 and is driven by the bridge drive. As the pinion 91 rotates, the bridge 54 moves. While the bridge 54 and the record receiver 52 are driven together, the knobs 75–77 are individually rotated to line the individual hair lines 85 up with the same points on the breaks 86–88 in the recordings 67–69 as described above. When the current from the alternating current source 105 is applied in parallel to the three potentiometers 106–108, the current flowing through each of the potentiometers is proportional to the scaling of the oscilloscope. As described above, the time at which the break is shown on the charts is proportional to the distance from the sound source to the individual ships. Thus, the resistance values set on the potentiometers 106–108 by the positioning of the hair lines 85 on the respective breaks 86–88 are proportional to the distances of the individual ships 13–15 from the sound source, the school of fish 11. The alternating currents derived from the potentiometers 106–108 from the source 105 are fed to the circle generators, where they effectively generate circular sweeps for the oscilloscope 61 having diameters proportional to the settings of the potentiometer slides 76–77. When the ships 13–15 initially separated from each other, the position of the ship 13 was recorded by appropriate equipment so that the location of the ships 14 and 15 with respect to the ship 13 would be known. When the location of a sound source is under way, the output from the direct current source 115 is modified in the X–Y potential generator 116 to generate a pair of coordinate potentials which represents the X and Y distances of the ship 13 from each of the ships 14 and 15. In other words, the X–Y potential generator 116 generates sets of potentials, one representative of the position of each of the ships 14 and 15 with respect to the ship 13. Three X–Y generators are shown for the case where the three ships 13–15 are listening posts and supply information to a fourth ship. The X–Y potentials thus generated are applied to the multiplex switch 62 and are periodically switched into the deflection terminals of the oscilloscope 61. Each of the sets of X–Y potentials positions the beam of the cathode ray tube when it is applied thereto, and the beam generates a spot of light on the face of the CRT where it strikes. This spot represents the position of that ship. Thus, the three sets of X–Y potentials generated by the generator 116 produce three spots of light on the face of the cathode ray tube at different locations. The beam blanking circuits 117 of the oscilloscope are controlled by the output of the multiplexing switch 62 so that the beam of the oscilloscope 61 is turned off unless there is an output from the multiplexing switch 62.

In addition to being applied directly to the multiplexing switch 62 for application to the oscilloscope 61, the sets of X–Y potentials from the generator 116 are also applied to the individual circle generators 111–113. Here, the apparatus must be coordinated to obtain correct results. The recorder 51 as shown in FIG. 4 has provision for more than three recordings although only three were used in this description. As mentioned above, an additional ship may be used. When an attempt is made to locate undersea life such as has been described, a selection may be made among the various ships. The ships to be monitored by the recorder 51 must be the same as the ships whose positions are being represented by the X–Y potentials developed by the generator 116. The outputs of the individual circle generators 111–113 are applied to the multiplexing switch 62, and through the multiplexing switch 62, one-at-a-time to the sweep inputs to the oscilloscope 61. The circles may be generated by using the same alternating current signals for both the horizontal and the vertical sweeps of the cathode ray tube in the oscilloscope 61. The size of the individual circles is controlled by the amplitude of the signal taken from the appropriate potentiometer 106–108. However, with nothing more, each of the circular sweeps would merely cause the beam of the CRT to sweep a circle about the center of the tube face. So, the X–Y potentials from the generator 116 are also applied to the corresponding circle generator to superimpose direct current biasing potentials upon the circular sweeps. The X–Y potentials have been described as placing spots on the face of the CRT when they are applied to the oscilloscope 61; when they are superimposed upon the circular sweep potentials, they cause the beam to deflect so that the individual circles are traced about the spot of light which represents the ship in question. Thus, the apparatus shown will place upon the face of a cathode ray tube three spots, each representative of the position of a ship which receives signals, and also place on the face of the CRT circles about each of the spots, the circles having diameters which represent the differences in the distances from one ship to the sound source and the other ships from the sound source. Thus, using the example of FIG. 2, the size of the circle about the ship 14 represents the difference between the distances of that ship and of ship 13 from the source 11, and the size of the circle about the ship 15 represents the difference in the distances between that ship and ship 13 from the source 11. This difference is achieved in the algebraic device 55 in which the output of potentiometer 108, representing the ship 13, is grounded to serve as a reference from which the potentials generated by the potentiometers 106 and 107 are measured. Thus, the spot on the face of the CRT which represents ship 13 has no circle about it. In accordance with this invention, the position of the sound source 11 with respect to the three ships 13–15 can be obtained by gradually increasing the diameters of the circles about the ships by the same amounts until they intersect. At the point of intersection lies the sound source 11. To gradually increase the size of the circles about the spots which represent the ships, the amplitude control 109 is changed slowly, increasing the amount of current applied to the circle generators 111–113. Since the current applied to all of the circle generators 111–113 is being increased by the same amount, the sizes of the circles generated by the circle generators 111–113 are also increased by the same amount. As the amplitude control 109 increases the currents supplied to the circle generators 111–113, the circles on the face of the cathode ray tube expand until they intersect. Although this description, for the sake of clarity, has created the impression that the procedure described may be slow, in actuality, it takes but a few seconds from the time the break in the pattern of the recordings 67–69 appears until the position of the source 11 is shown on the oscilloscope 61.

Of course, there are variations of this equipment which may be used to accomplish the same results. For example, this description has indicated the use of listening devices for providing the three signals which present the relative locations of a fourth signal source. However, if a signal generated by a vehicle is transmitted to stationary transponders to cause the transponders to answer back, the differences in the times of reception of the vehicle's signal by the several transponders can be recorded and the method used to locate the vehicle with respect to the transponders. In addition, the transmissions by the transponders can be tagged to identify them so that the position of the vehicle with respect to the earth, or a spot on the earth, can be determined. The recorder has been described as a chart recorder having a plurality of pens or markers. Any recorder having a plurality of marking elements may be used or a plurality of recorders can be used. The type of recorder can be determined by the other uses to which it is to be placed. One example of a recorder which can be used is disclosed in Patent 2,437,242 to Cole et al. Actually, instead of a recorder, a memory and associated timing circuits can be used. For example, capacitors which are charged by a triangular potential between the times that the vehicle signal was transmitted and the return signal was received could be used, and they could be differentially applied to an algebraic circuit to determine the sizes of the circles.

It is realized that the above description may indicate to others in the art additional ways in which the principles of this invention can be used without departing from its spirit. It is, therefore, intended that this invention be limited only by the scope of the appended claims.

What is claimed is:

1. A locator system for determining the position of an object, said system comprising a headquarters station, a plurality of spaced first means for transmitting to said headquarters station separate signals representative of the individual distances between said object and each of said first means, second means at said headquarters station for determining from said signals the differences in the distances between said object and each of said first means and for generating separate electrical potentials individually proportional to each of said differences, display means for displaying the relative locations of each of said first means, means for applying said electrical potentials to said display means for generating about each of said displayed locations display circles having radii which are individually representative of said differences with respect to a designated first means, and fourth means for simultaneously enlarging all of said circles at the same rate until they intersect at a point which indicates the relative position of said object.

2. A system for locating signal sources rapidly and accurately, said system comprising first, second and third stations situated at spaced locations; means at each of said stations for receiving first signals from a source of first signals and for converting said first signals into second electrical signals; an electrical receiver at one of said stations; means for transmitting said electrical signals from all of said other stations to said one station; means at said one station for determining from the received electrical signals the differences in times of reception of the same first signals from said source by said first station and each of said second and third stations; a cathode ray tube oscilloscope; means for displaying on the face of said cathode ray tube the relative locations of said first, second and third station; means for surrounding the individual displays of each of said second and third stations with a circle which represents the difference in the time of reception of said signals between said first station and that station; and means for increasing the diameters of the circles about said three station displays equally and simultaneously until they intersect at a common point which designates the relative location of said source of first signals with respect to said first, second and third stations.

3. The system defined in claim 2 wherein said means at said first station for determining the differences in the times of reception comprises a storage device for storing with respect to time each of said received electrical signals, means for identifying the same point in each of said stored electrical signals, means for measuring the difference in times between the same points on said separate electrical signals, and means for generating electrical potentials proportional to said differences in time.

4. The system defined in claim 3 wherein said storage device comprises a recorder for recording each of said received electrical signals, said recorder comprising a record receiver, and means for moving said record receiver with respect to time to establish time differences between the same points of separate records.

5. The system defined in claim 4 wherein said recorder further comprises a plurality of hair lines, means for moving said plurality of hair lines simultaneously in synchronism with said record receiver to prevent relative movement therebetween, means for manually adjusting individual hair lines to align them with the same point on said individual records, means for modifying an electrical potential in proportion to the adjustment of each of said hair lines, and means for using said modified potentials to establish the initial diameters of said displayed circles.

6. The system defined in claim 2 further including means for generating potentials representing coordinates of each of said station locations with respect to each other, means for applying said coordinate potentials to said oscilloscope, means for blanking said beam except when each set of coordinate potentials is applied to said oscilloscope to present the locations of said first, second and third stations as dots on the face of said cathode ray tube.

7. The system defined in claim 6 wherein said means for surrounding said individual displays of the station locations with circles comprises at least one circle generator, means for generating electrical potentials proportional to the time differences between the reception of first signals by said first station and the reception of the same first signal by said second and by said third stations, means for applying said potentials individually to said circle generator to generate individual circles having diameters which are proportional to the time difference representing potentials, means for applying to said circle generators the corresponding coordinate potentials of the station locations, and means for applying the potentials from said circle generator to said oscilloscope so that the generated circles are disposed about the appropriate station locations as displayed on the cathode ray tube face.

8. The system defined in claim 7 including a circle generator for each of said first, second and third stations, a sweep switch having a single output connected to the input of said oscilloscope and a plurality of inputs, means for connecting one of said inputs to the output of each of said circle generators, and means for causing said switch to sweep through its cycle and sequentially connect said single output to each of said inputs individually, whereby the outputs from said circle generators are sequentially applied to the input of said oscilloscope.

References Cited

UNITED STATES PATENTS 3,116,471 12/1963 Coop _____ 340—6 X
3,160,846 12/1964 Gustafson et al. _____ 340—2 X RICHARD A. FARLEY, *Primary Examiner.*